(12) United States Patent
Allwood et al.

(10) Patent No.: US 7,858,887 B2
(45) Date of Patent: Dec. 28, 2010

(54) BROADBAND OVER POWER LINE LOOM

(75) Inventors: Brent David Allwood, Buttaba (AU); Wayne William Dennes, Wyoming (AU)

(73) Assignee: ADC GmbH, Berlin (DE)

( * ) Notice: Subject to any disclaimer, the term of this patent is extended or adjusted under 35 U.S.C. 154(b) by 239 days.

(21) Appl. No.: 12/200,332

(22) Filed: Aug. 28, 2008

(65) Prior Publication Data

US 2009/0059484 A1 Mar. 5, 2009

Related U.S. Application Data

(60) Provisional application No. 60/967,346, filed on Sep. 4, 2007.

(51) Int. Cl.
*H01R 13/502* (2006.01)

(52) U.S. Cl. .......................... 174/562; 174/41; 174/563

(58) Field of Classification Search ................. 174/563, 174/562, 41; 361/752
See application file for complete search history.

(56) References Cited

U.S. PATENT DOCUMENTS

| | | | |
|---|---|---|---|
| 6,292,371 B1 * | 9/2001 | Toner, Jr. ..................... | 361/752 |
| 6,337,438 B1 * | 1/2002 | Oyamada ..................... | 174/535 |
| 6,852,924 B2 * | 2/2005 | Lessard ........................ | 174/50 |
| 7,049,512 B1 * | 5/2006 | Chung et al. ................. | 174/58 |
| 7,145,440 B2 | 12/2006 | Gerszberg et al. | |
| 7,489,105 B2 * | 2/2009 | Weinstein et al. ............ | 320/114 |
| 7,522,812 B2 * | 4/2009 | Zitting ......................... | 385/147 |
| 2004/0183726 A1 * | 9/2004 | Theobold ............. | 343/700 MS |
| 2006/0185877 A1 | 8/2006 | Soffer | |
| 2007/0176723 A1 | 8/2007 | Renz et al. | |
| 2008/0083547 A1 * | 4/2008 | Pinol Pedret et al. .......... | 174/50 |

FOREIGN PATENT DOCUMENTS

WO WO 2007/112507 A1 10/2007

OTHER PUBLICATIONS

International Search Report and Written Opinion mailed May 20, 2009.

* cited by examiner

*Primary Examiner*—Hung V Ngo
(74) *Attorney, Agent, or Firm*—Merchant & Gould P.C.

(57) ABSTRACT

A broadband over power line housing which allows coupling between power lines and a broadband signal system. Cables enter and exit from a first housing portion. Connection circuitry is housed in a second housing unit selectively connectable to the first housing unit. A latch provides the selective connection, and includes three positions: a first latched position wherein the circuitry within the first and second housing units is electrically connected; a second latched position wherein the circuitry is disconnected; and a disconnected position where the first and second housing portions can be separated from one another. In one embodiment, the latch is operated with a hook stick between the first and second positions, allowing an operator to engage or disengage the circuitry from the ground. A visual indicator may be provided to indicate to the operator when the housing is in the latched and electrically disconnected state.

14 Claims, 16 Drawing Sheets

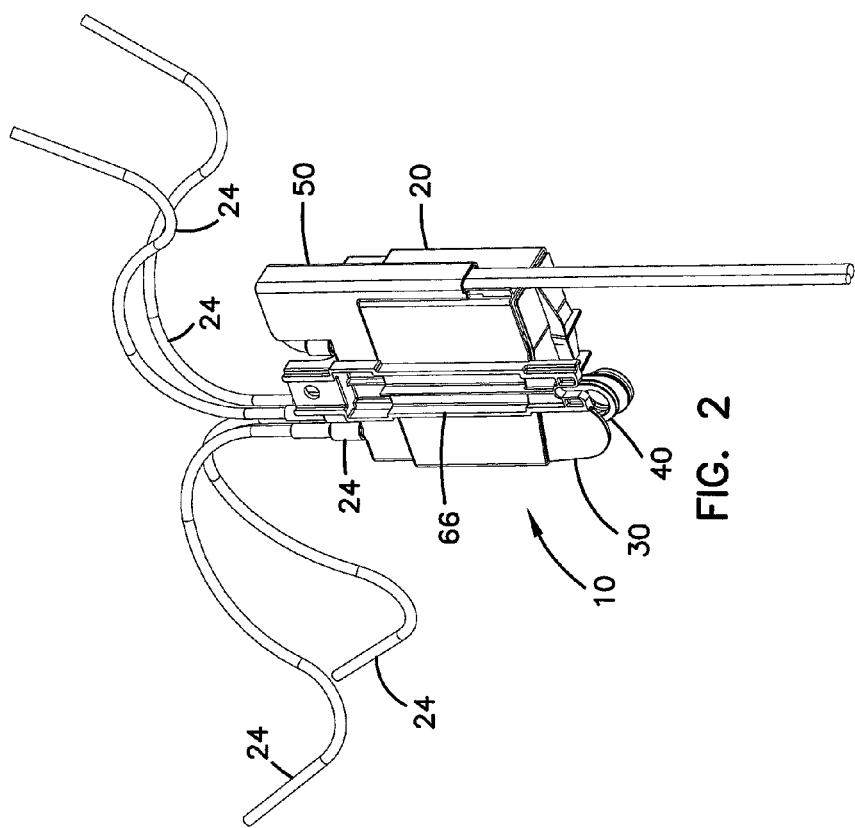
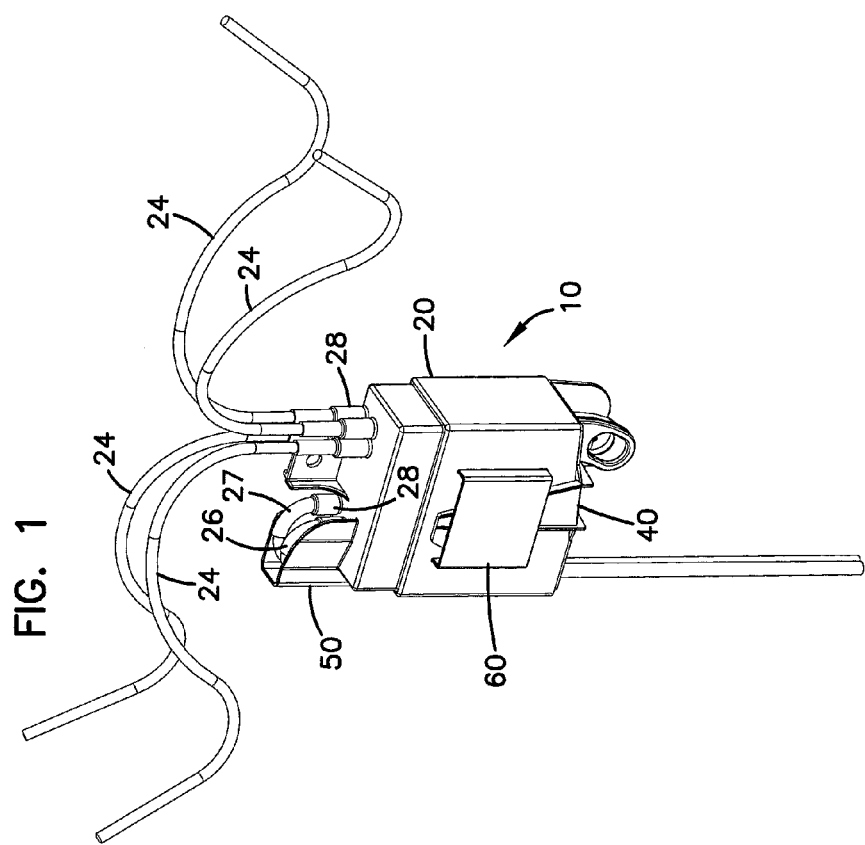

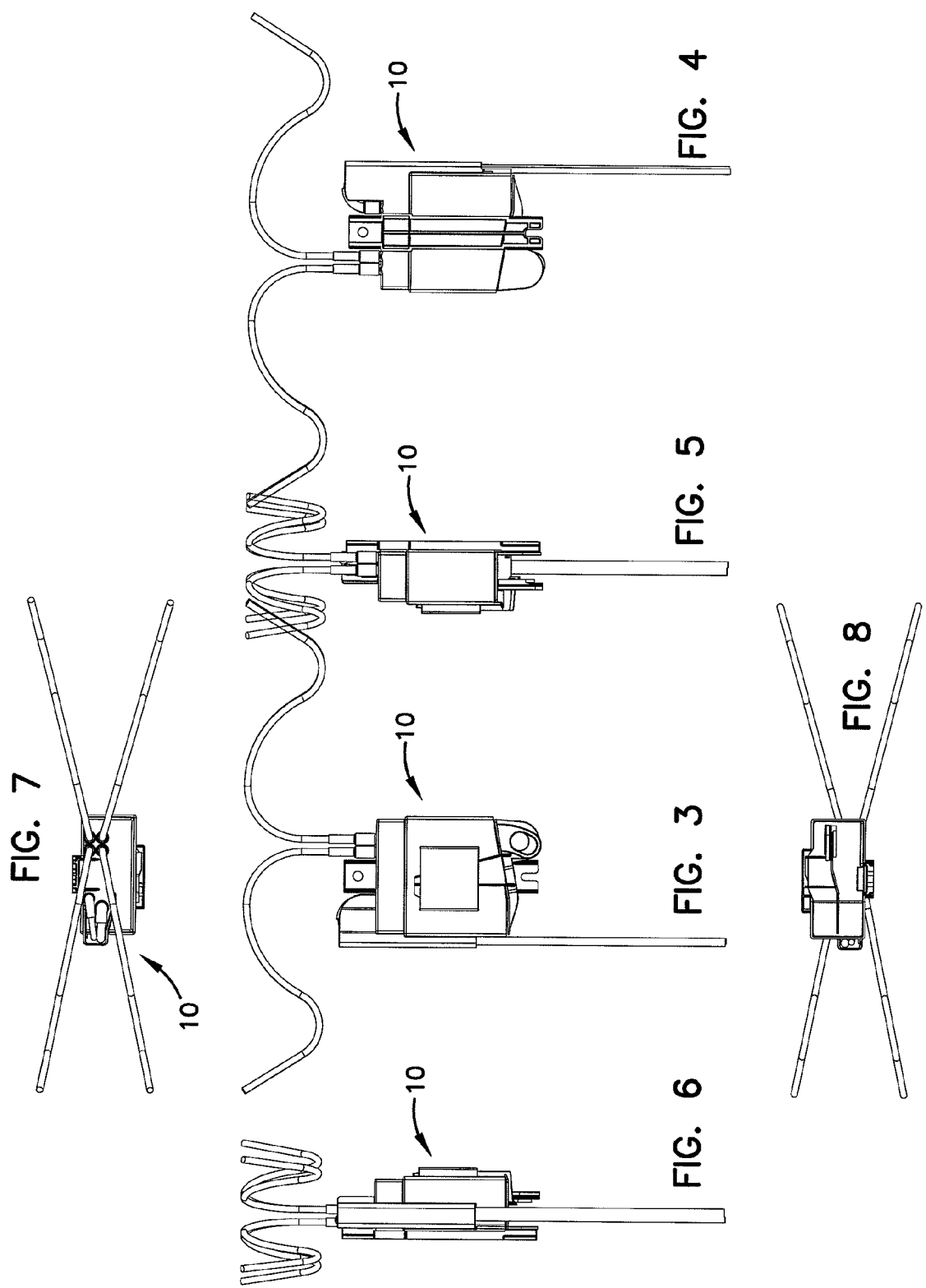

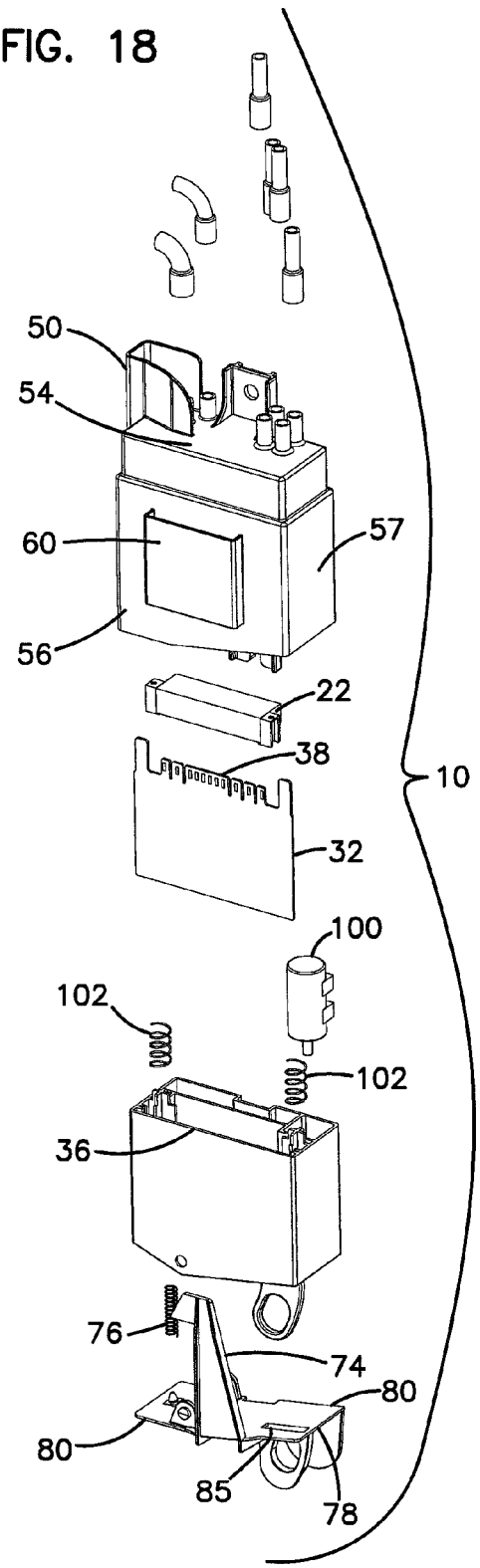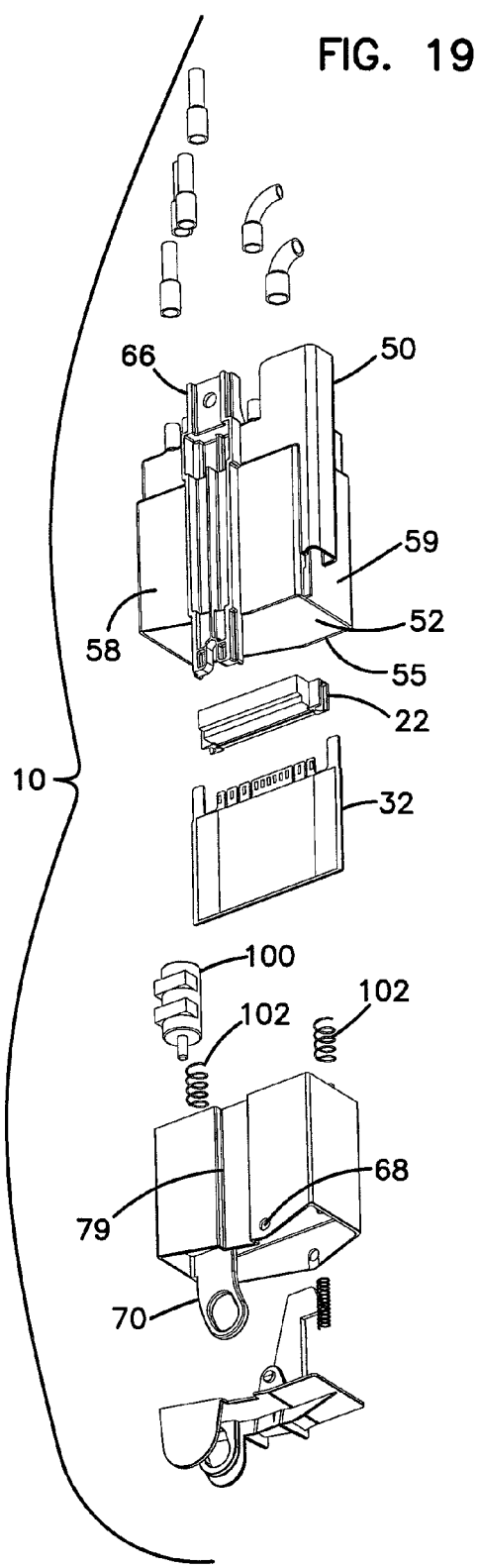
FIG. 18
FIG. 19

US 7,858,887 B2

BROADBAND OVER POWER LINE LOOM

CROSS-REFERENCE TO RELATED APPLICATION

This application claims the benefit of U.S. Provisional Patent Application Ser. No. 60/967,346, filed Sep. 4, 2007, the disclosure of which is hereby incorporated by reference in its entirety.

BACKGROUND

Power line communication involves sending electrical data signals through electrically conductive power cables together with electric power signals. Such a system allows broadband data signals to be sent to and from customer premises along the shared, energized power lines.

SUMMARY

The present invention concerns a broadband over power line apparatus and method which includes a broadband over power line coupling circuit for connecting between power lines and a broadband signal system. The apparatus further allows selective connection and disconnection of the broadband over power line coupling circuit between the power lines and the broadband signal system.

In one embodiment, the apparatus includes a loom device including a housing with circuitry which injects two signals onto three phases of medium voltage power lines. The housing also utilizes power from these power lines and the neutral line to power the circuitry and also to provide power to the circuitry that interfaces the signal between it and the broadband signal source, for example, an optical fiber network. The housing includes a latch for selectively connecting and disconnecting the circuit. The latch also preferably allows removal of components to repair or replace while not disrupting the cable connections. Preferably, the latch, which moves between connected and disconnected states for the circuit, is operable using a hook stick while the apparatus is aerially mounted.

BRIEF DESCRIPTION OF THE DRAWINGS

FIG. 1 is a front and top perspective view of a broadband over power line loom, according to one embodiment of the present invention, where the loom is in a first latched position.

FIG. 2 is a rear and bottom perspective view of the loom of FIG. 1.

FIG. 3 is a front view of the loom.
FIG. 4 is a rear view of the loom.
FIG. 5 is a right side view of the loom.
FIG. 6 is a left side view of the loom.
FIG. 7 is a top view of the loom.
FIG. 8 is a bottom view of the loom.
FIG. 18 is an exploded front and top perspective view of the loom.
FIG. 19 is an exploded rear and bottom perspective view of the loom.

DETAILED DESCRIPTION

Figure 10:
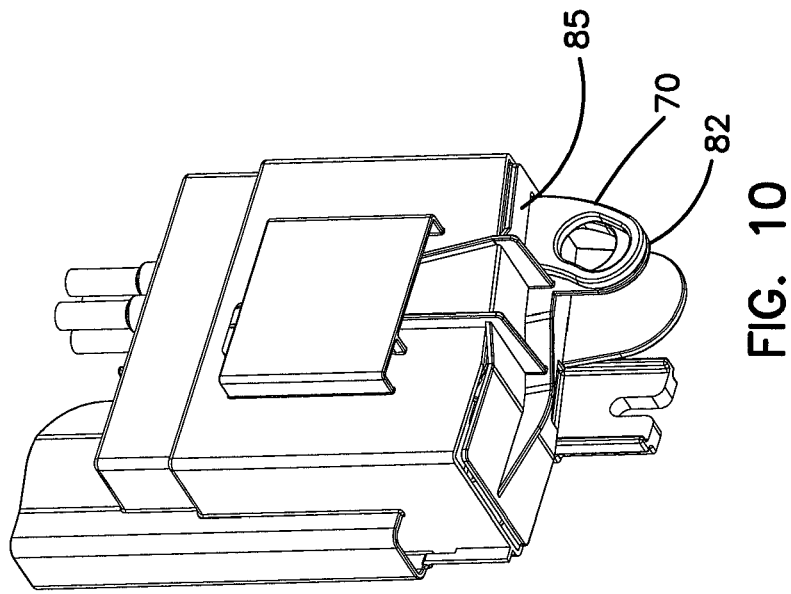
FIG. 10 is a front and bottom perspective view of the loom without the cables.
Figure 11:
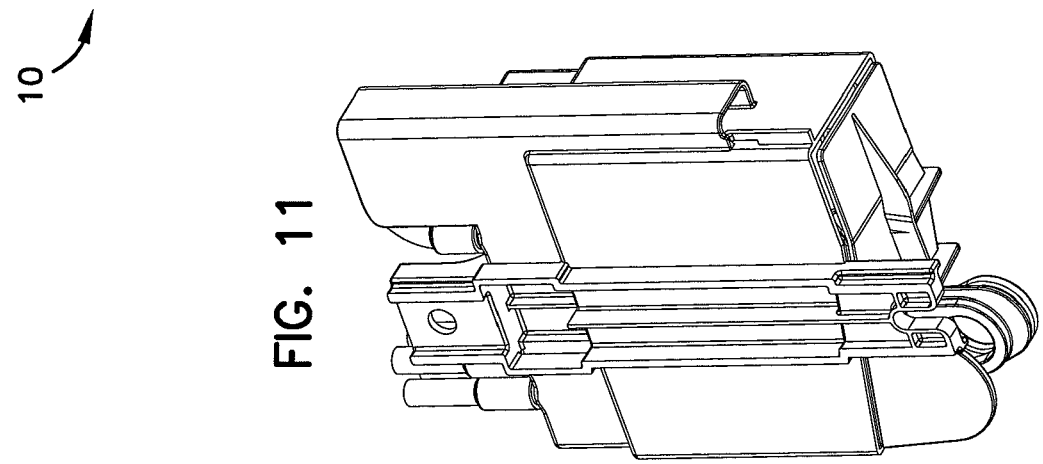
FIG. 11 is a rear and bottom perspective view of the loom without the cables.
Figure 9:
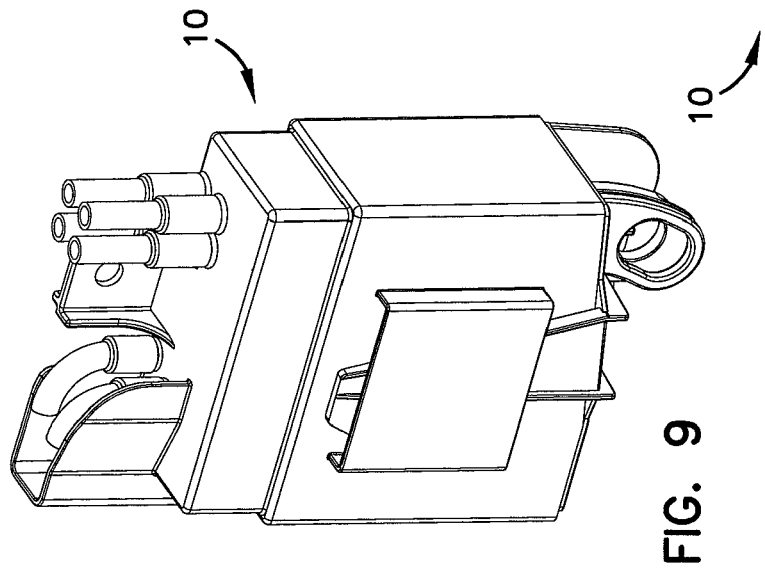
FIG. 9 is a front and top perspective view of the loom without the cables.
Figure 13:
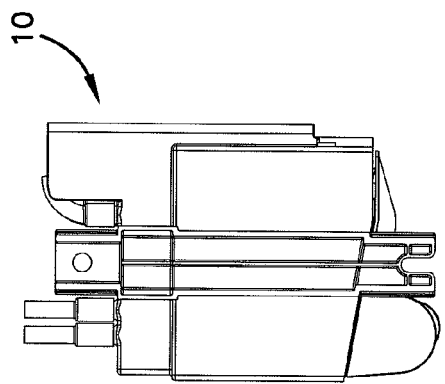
FIG. 13 is a rear view of the loom without the cables.
Figure 14:
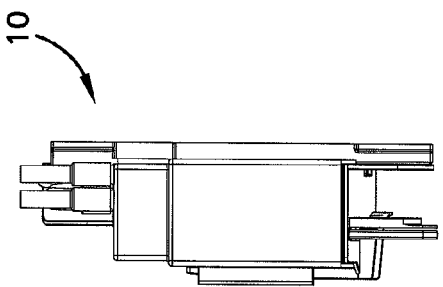
FIG. 14 is a right side view of the loom without the cables.
Figure 16:
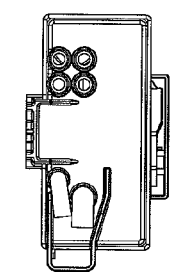
FIG. 16 is a top view of the loom without the cables.
Figure 12:
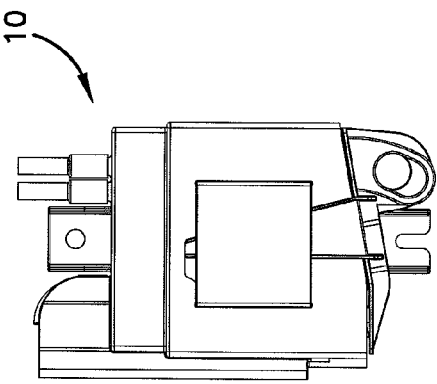
FIG. 12 is a front view of the loom without the cables.
Figure 17:
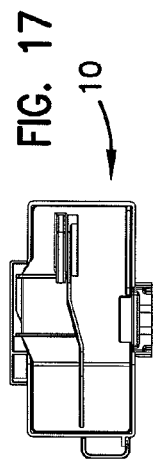
FIG. 17 is a bottom view of the loom without the cables.
Figure 15:
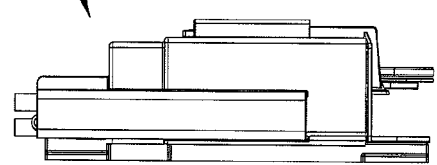
FIG. 15 is a left side view of the loom without the cables.
Figure 21:
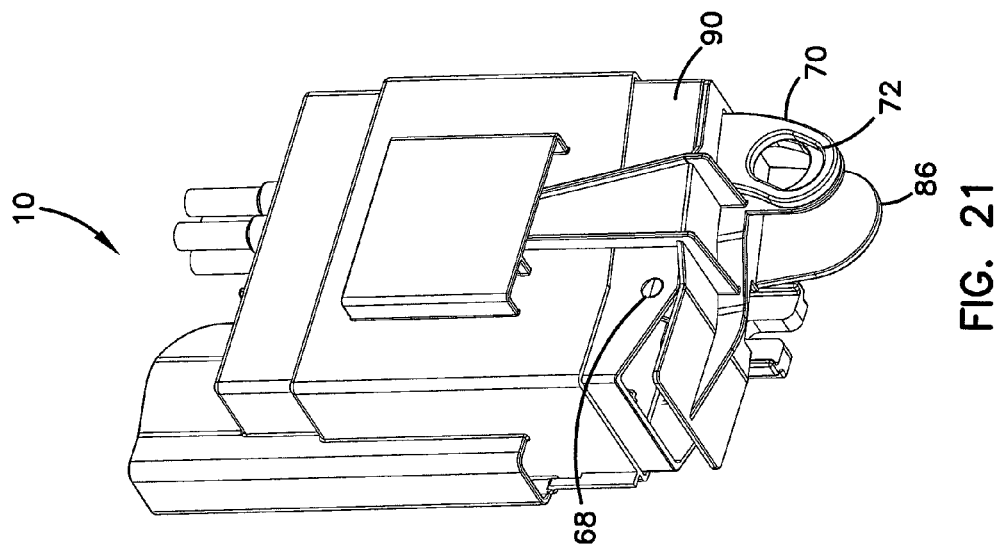
FIG. 21 is a front and bottom perspective view of the view shown in FIG. 20.
Figure 22:
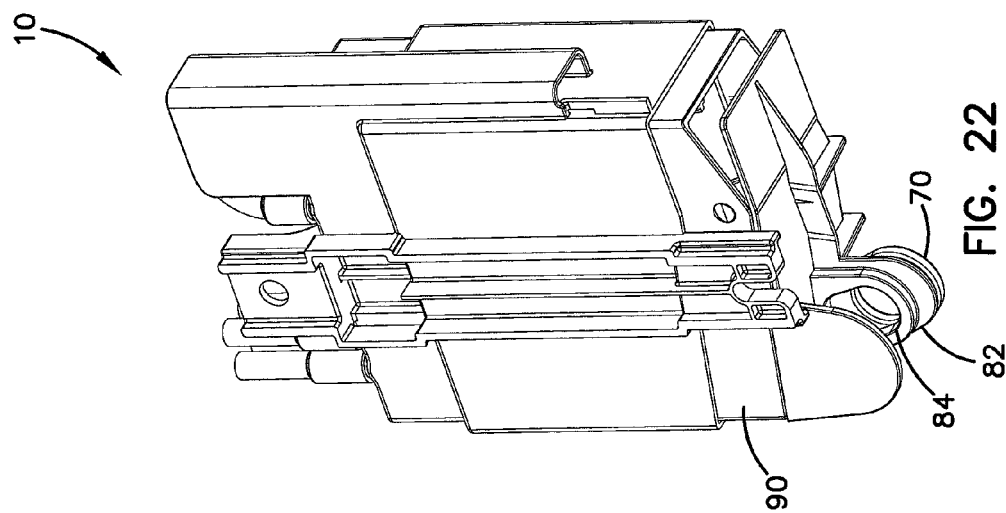
FIG. 22 is a rear and bottom perspective view of the view shown in FIG. 20.
Figure 20:
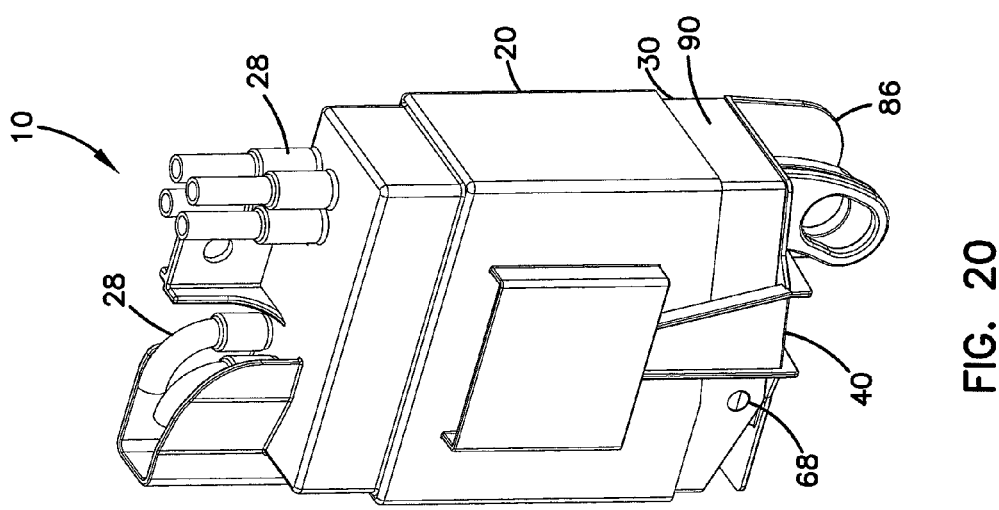
FIG. 20 is a front and top perspective view of the loom shown in a second latched position, wherein the coupling circuit is disengaged from the power lines.
Figure 24:
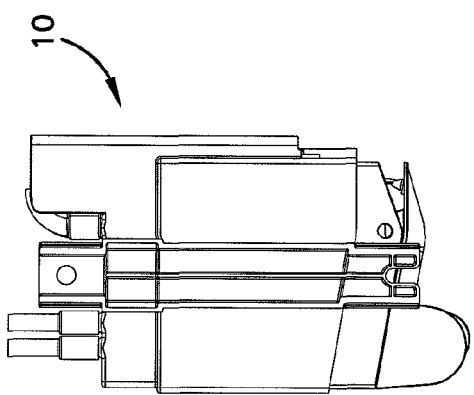
FIG. 24 is a rear view of the view shown in FIG. 20.
Figure 25:
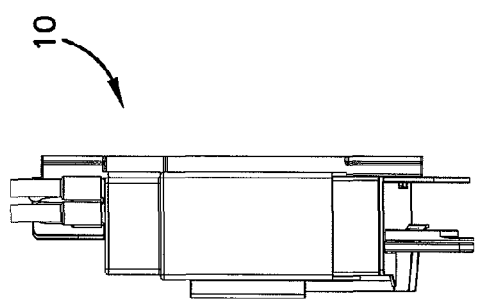
FIG. 25 is a right side view of the view shown in FIG. 20.
Figure 27:
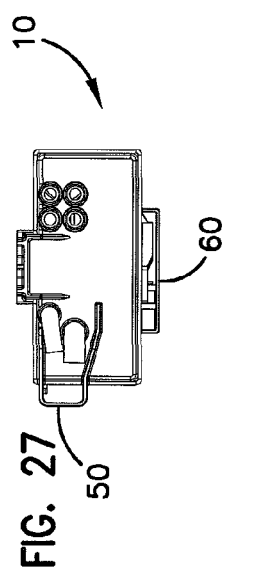
FIG. 27 is a top view of the view shown in FIG. 20.
Figure 23:
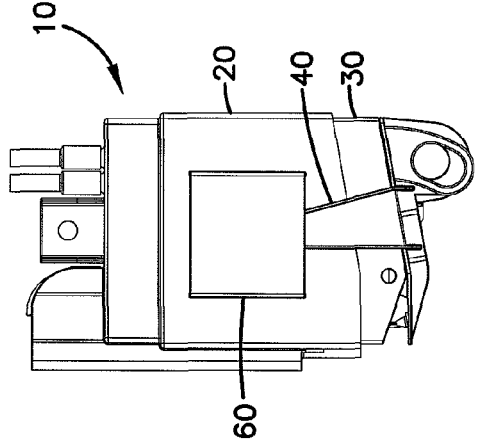
FIG. 23 is a front view of the view shown in FIG. 20.
Figure 28:
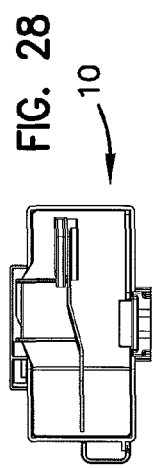
FIG. 28 is a bottom view of the view shown in FIG. 20.
Figure 26:
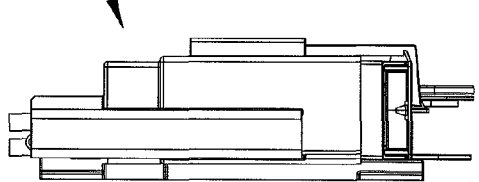
FIG. 26 is a left side view of the view shown in FIG. 20.
Figure 30:
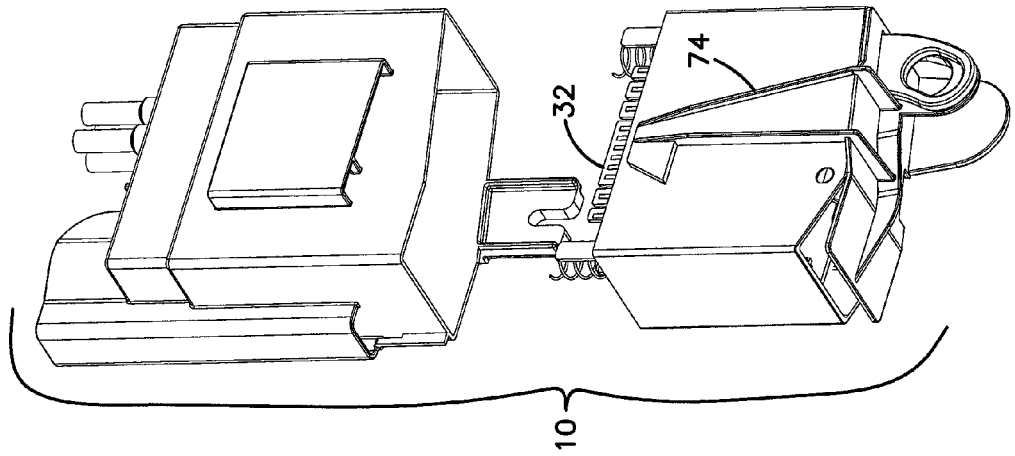
FIG. 30 is a front and bottom perspective view of the view shown in FIG. 29.
Figure 31:
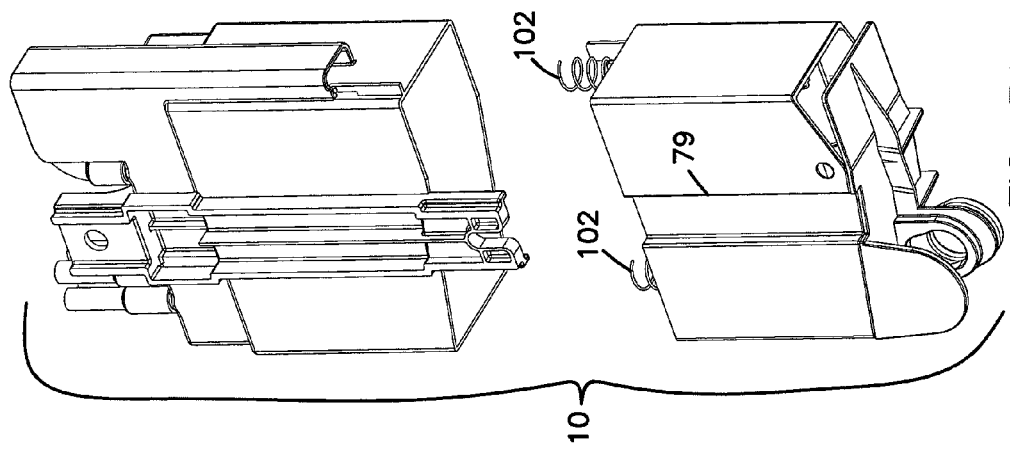
FIG. 31 is a rear and bottom perspective view of the view shown in FIG. 29.
Figure 29:
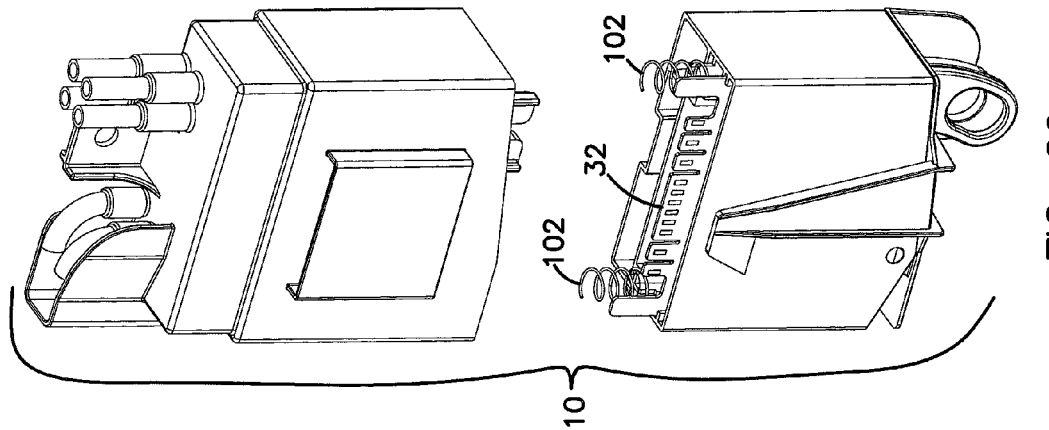
FIG. 29 is a front and top perspective view of the loom shown in a third unlatched position, wherein an inner housing is separated from an outer housing.
Figure 32:
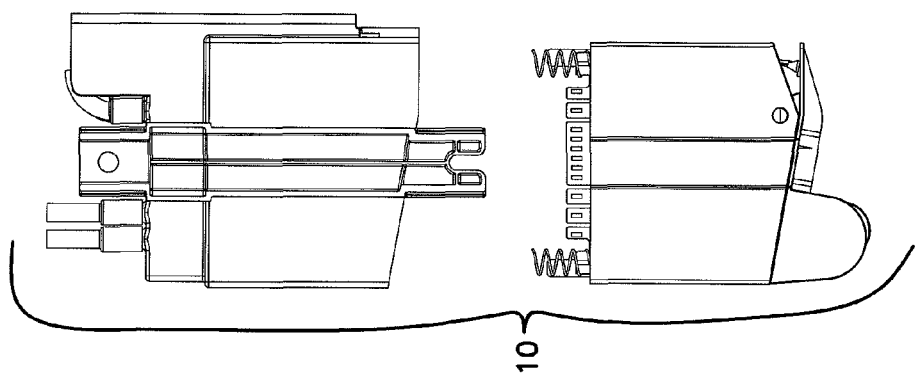
FIG. 32 is a front view of the view shown in FIG. 29.
Figure 33:
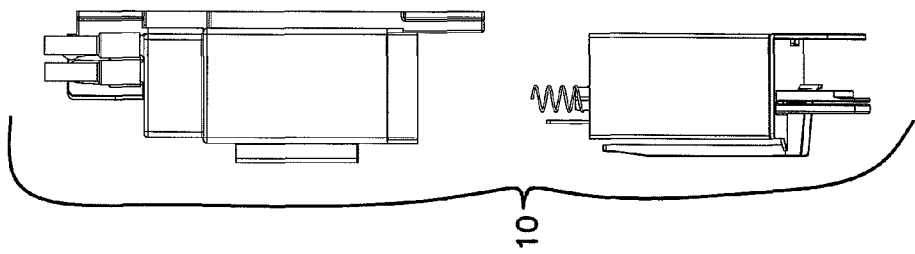
FIG. 33 is a rear view of the view shown in FIG. 29.
Figure 34:
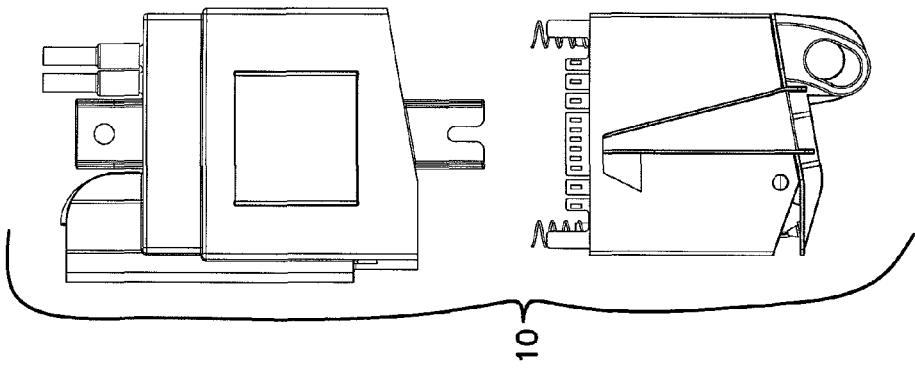
FIG. 34 is a right side view of the view shown in FIG. 29.
Figure 35:
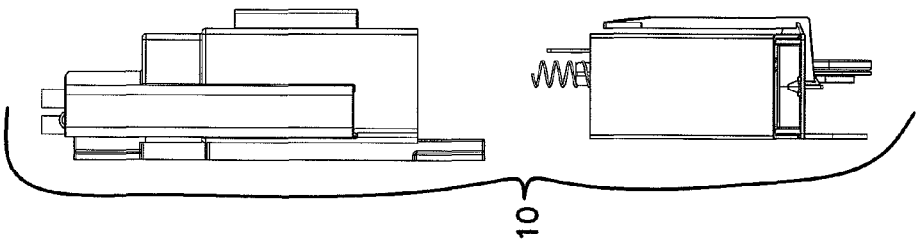
FIG. 35 is a left side view of the view shown in FIG. 29.

Referring now to the figures, an example embodiment for a loom or housing 10 is shown. Housing 10 includes an outer housing 20, an inner housing 30, and a latch 40 for selectively holding the outer housing to the inner housing. Housing 10 includes an electrical circuit connection between the broadband signal source and the power lines. The connection includes an edge connector 22 carried by outer housing 20, and a PCB 32 carried by inner housing 30. By connecting and disconnecting edge connector 22 and PCB 32, selective connection and disconnection of the broadband signal source with the power lines occurs.

Outer housing 20 preferably has all incoming and outgoing wires housed and connected within the terminals of edge connector 22. In the illustrated example, the cable entries include four single-core, double-insulated cables 24 which connect to the power lines, and two exit cables 26, 27 which connect to the broadband signal interface unit. In one example, one of exit cables 26, 27 is a balanced screen twisted pair cable, and the other is an EMC shielded power cable. All of the cable entries and cable exits include heat shrink tubing 28 to seal the entry points around the wires from water ingress. Exiting wires are oriented in a downward position once outside the housing, and are protected from contact and damage by a shroud 50. Outer housing 20 includes an interior 52 which houses edge connector 22. Outer housing 20 includes a top 54 with the cable entries and sides 56, 57, 58, 59. An open bottom 55 is on an opposite end from top 54. Disposed about an exterior of outer housing 20 is a cover plate 60 which protects first and second catches 62, 64 for use with the latch, as will be described below.

Outer housing 20 further includes a mount 66 for mounting the unit to a power pole by either screwing or straps. Alternatively, housing 10 can be secured directly to the overhead power line.

Outer housing 20 allows inner housing 30 to slide within it, and provides guidance for the engagement of PCB 32 with edge connector 22. Inner housing 30 includes an open top end 34, a closed bottom 35, with an interior 36 for housing PCB 32. A resin can be poured into interior 36 to surround the PCB 32 in order to secure and encapsulate the PCB 32, leaving only contact pads 38 that interface with edge connector 22 exposed. Inner housing 30 slides vertically within outer housing 20 and has two latched positions, as will be described below. Inner housing 30 includes a hinge point 68, a tab 70, and a slot 72 positioned in tab 70 for use in selective latching, as will be described below. Inner housing 30 includes a notch 79 for receiving any fasteners in mount 66. In the illustrated example, outer housing 20 is an upper housing, and inner housing 30 is a lower housing.

Latch 40 is hinged to inner housing 30 at hinge point 68. Latch 40 includes a latch arm 74 and a spring 76 that causes the latch arm to self-engage with latch features (catches 62, 64) of outer housing 20. Latch 40 includes a first side portion 78 and a second side portion 80 on opposite sides of hinge point 68. Latch 40 includes a lower tab 82 and a slot 84 for use in operating latch 40. Latch 40 further includes a blocker plate 86 which blocks access to slot 84 from one side of tab 82. Tab 70 of inner housing 30 passes through first side 78 of latch 40 at an aperture 85.

Figure 36:
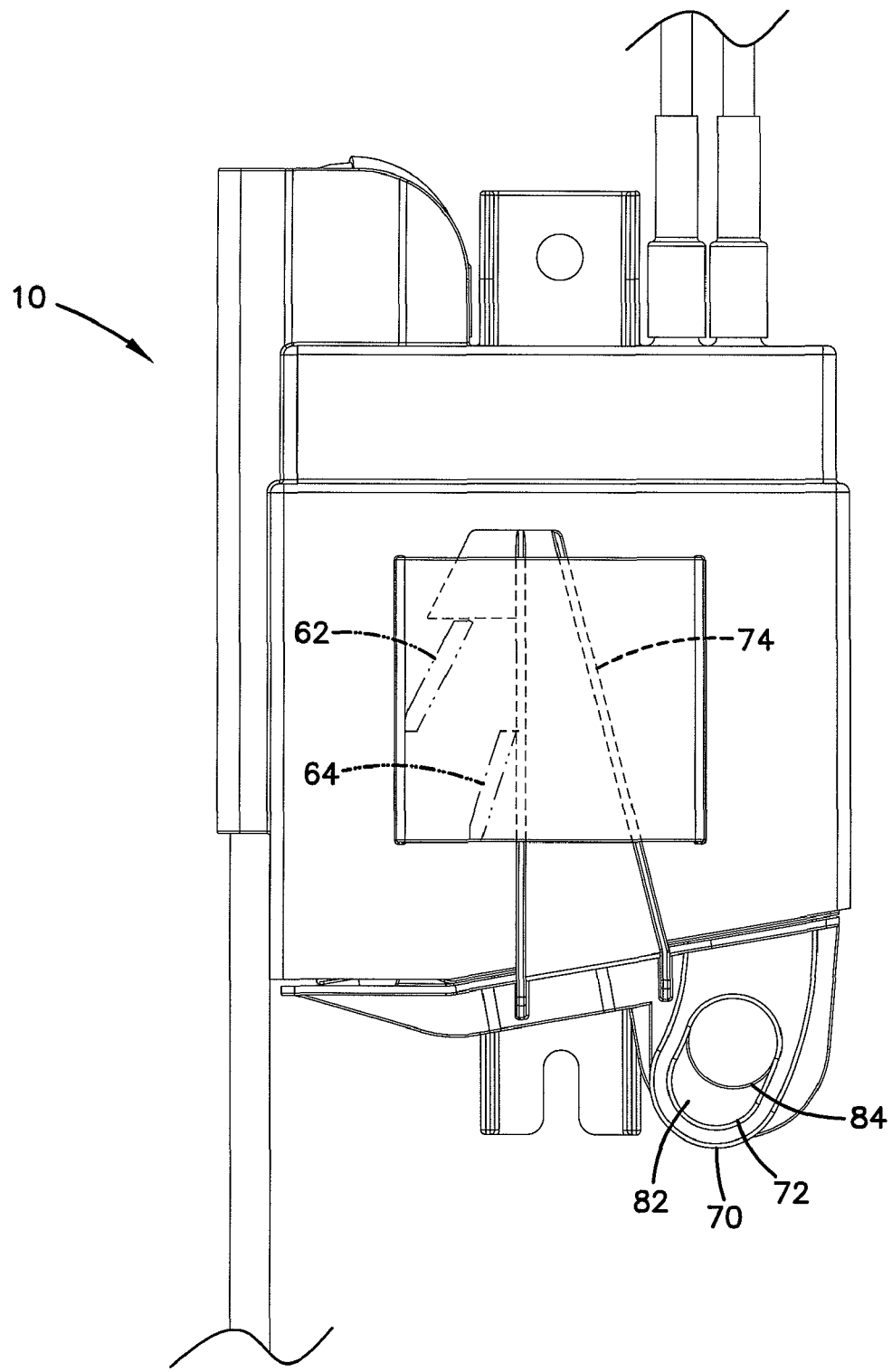
FIGS. 36 through 42 show the loom in various states during use, including the first latched position (FIG. 36), the second latched position (FIG. 39), and the third unlatched position (FIG. 42), and positions therebetween.
Figure 37:
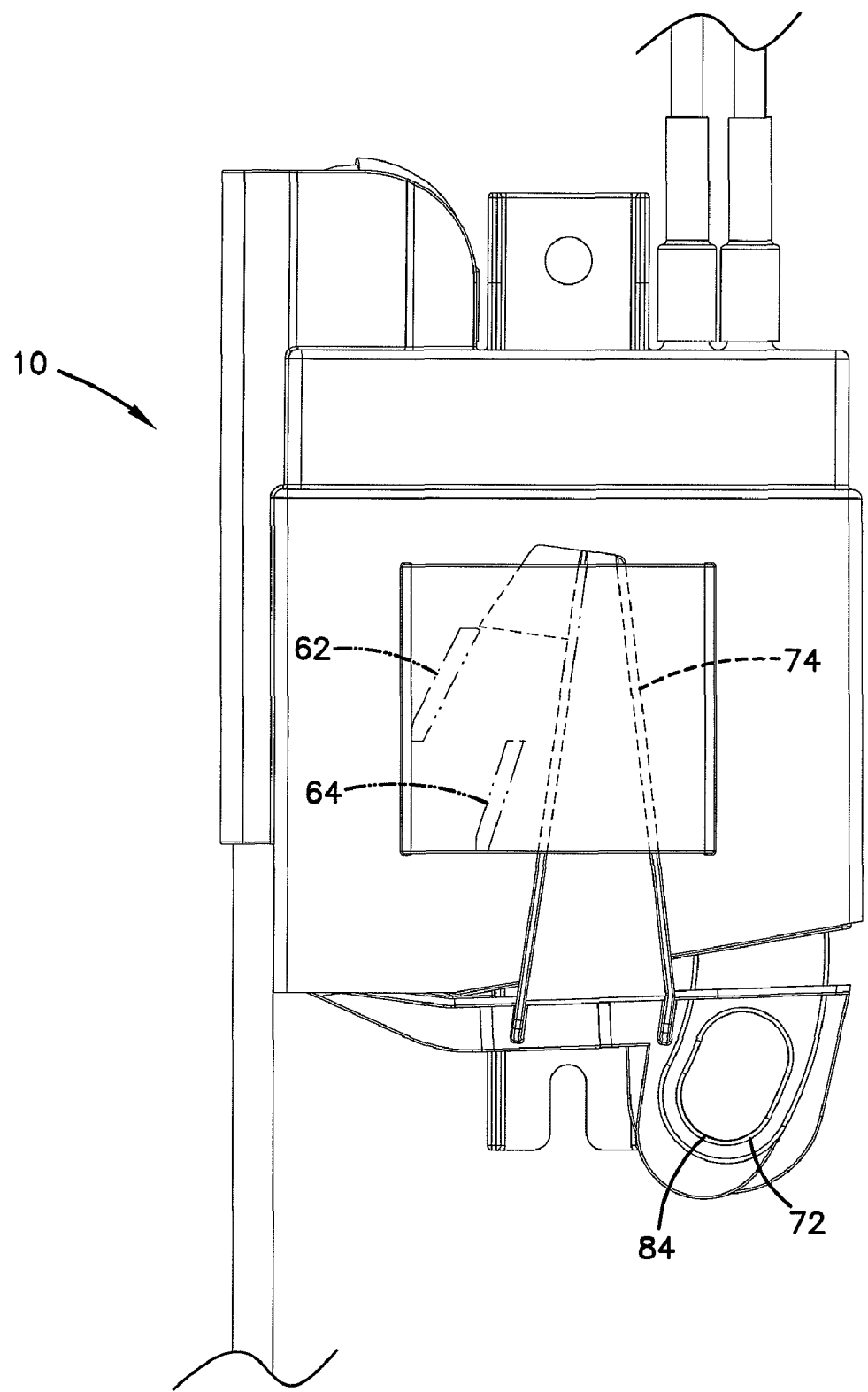
Figure 38:
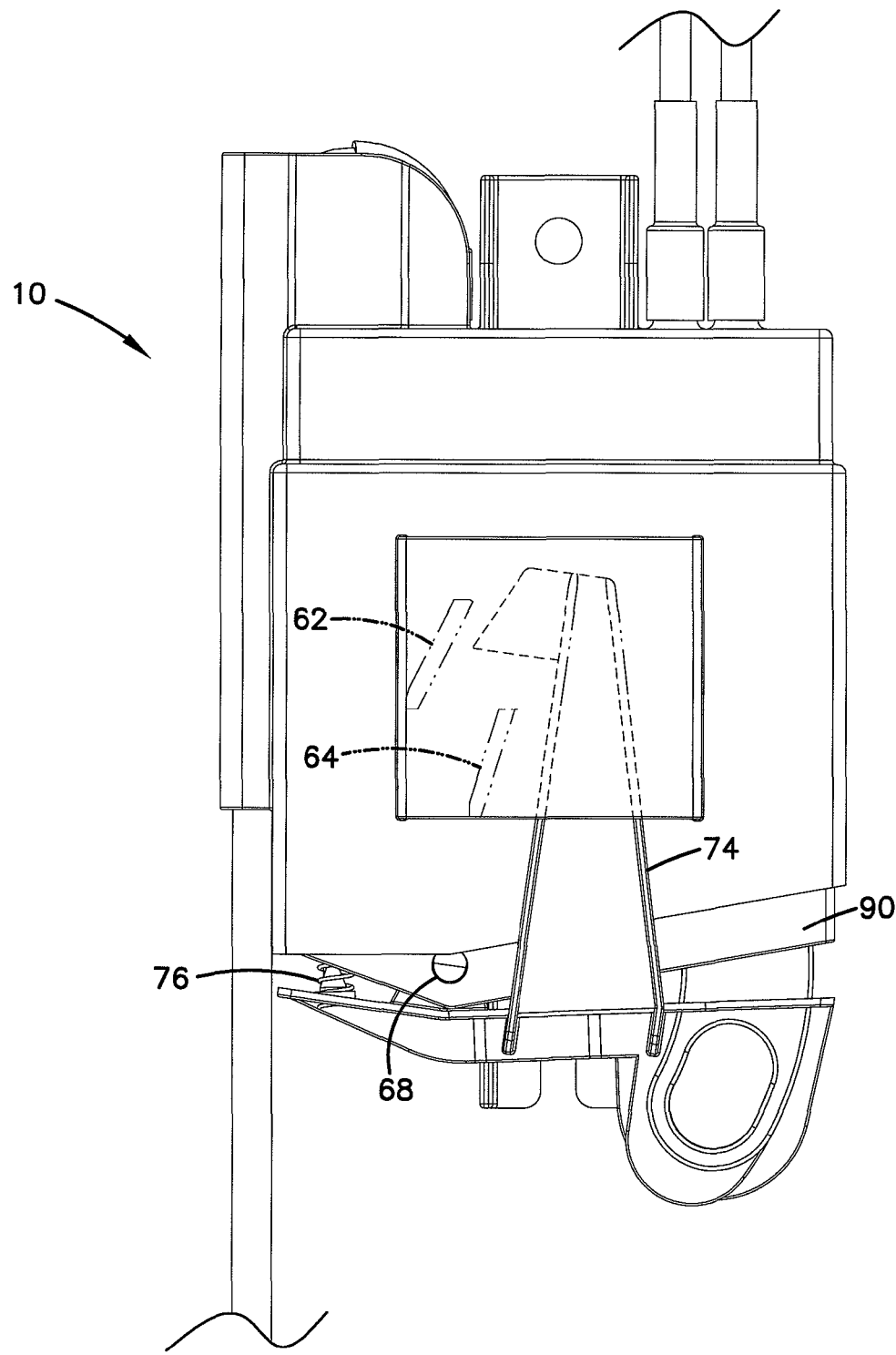
Figure 39:
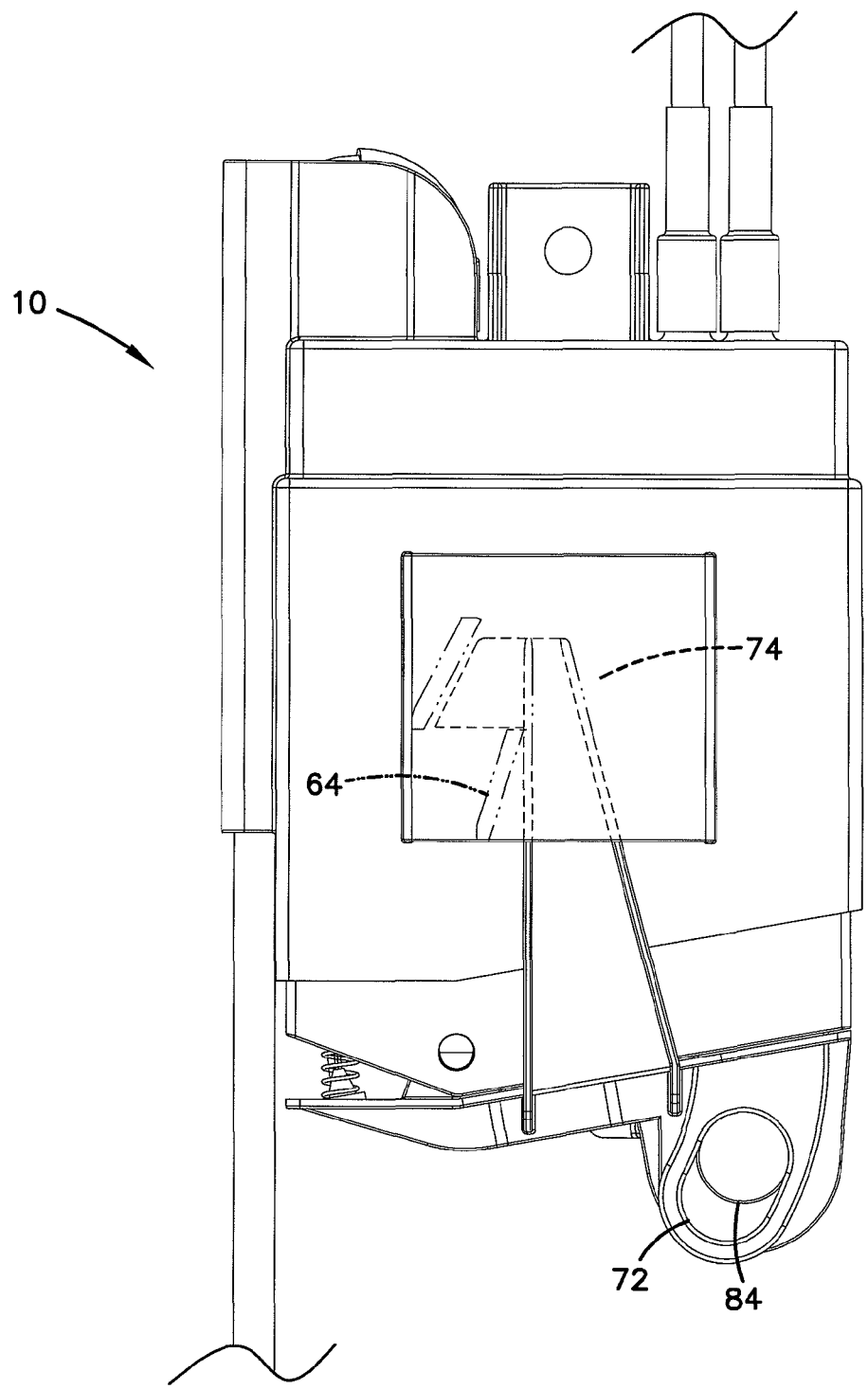
Figure 40:
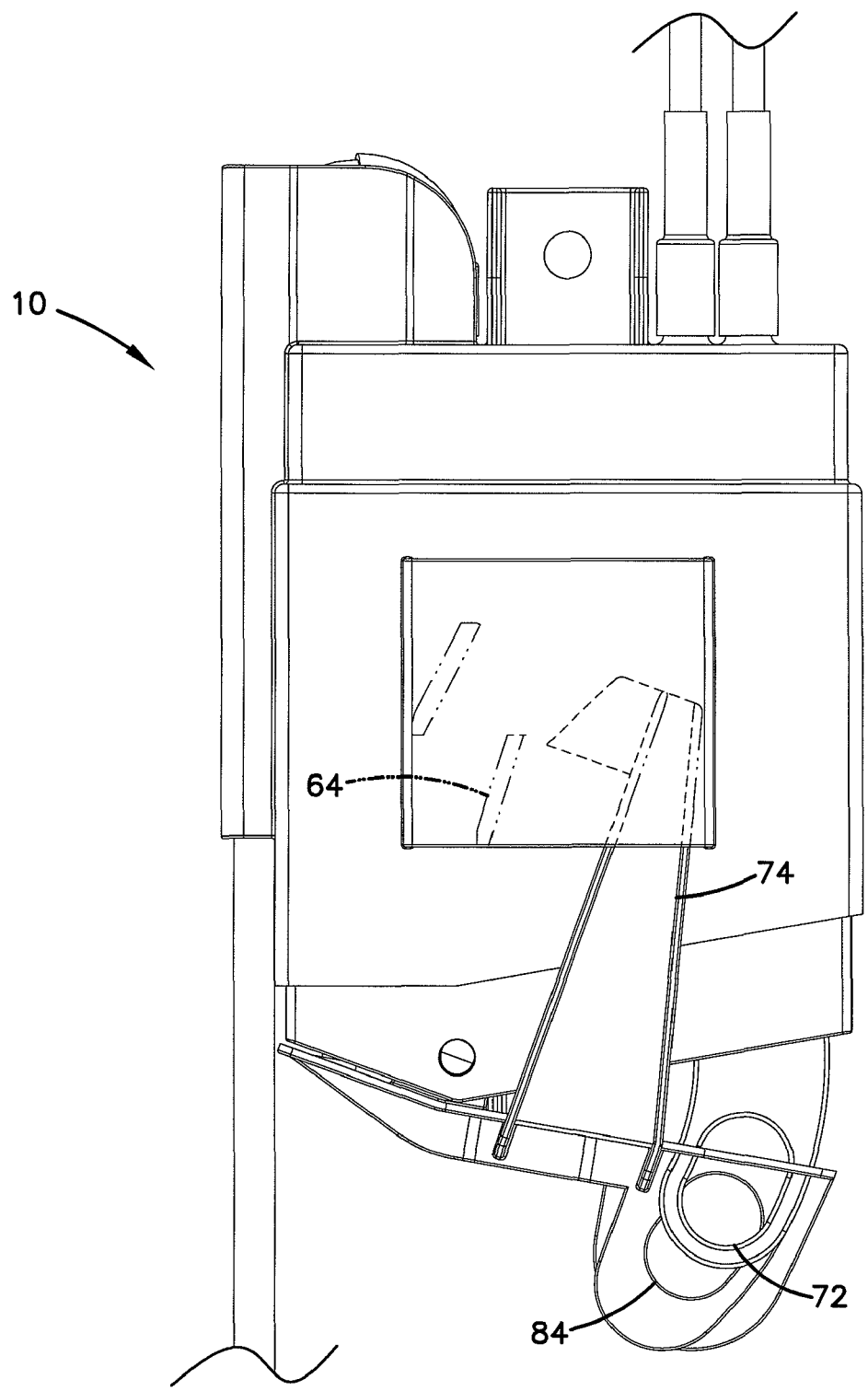
Figure 41:
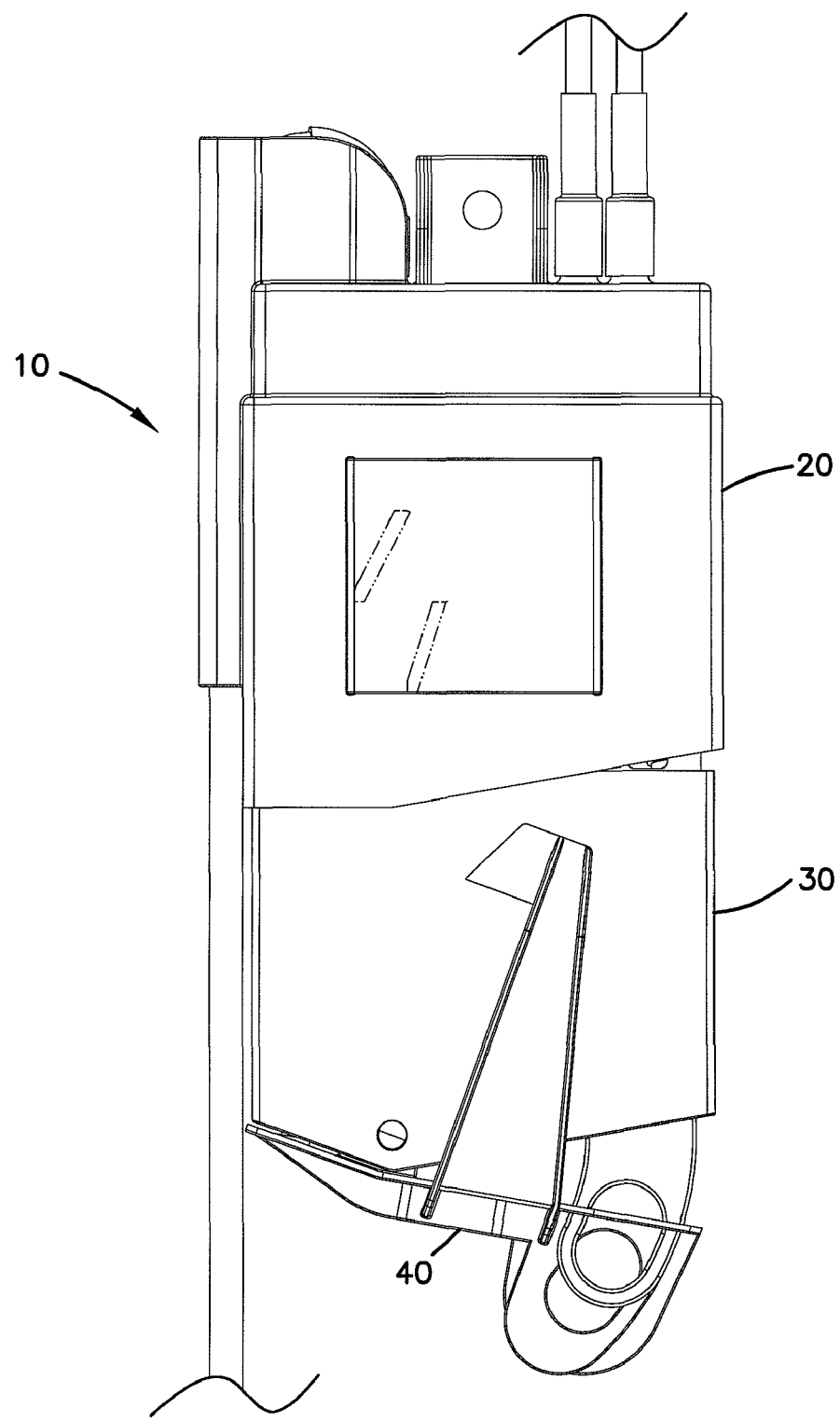
Figure 42:
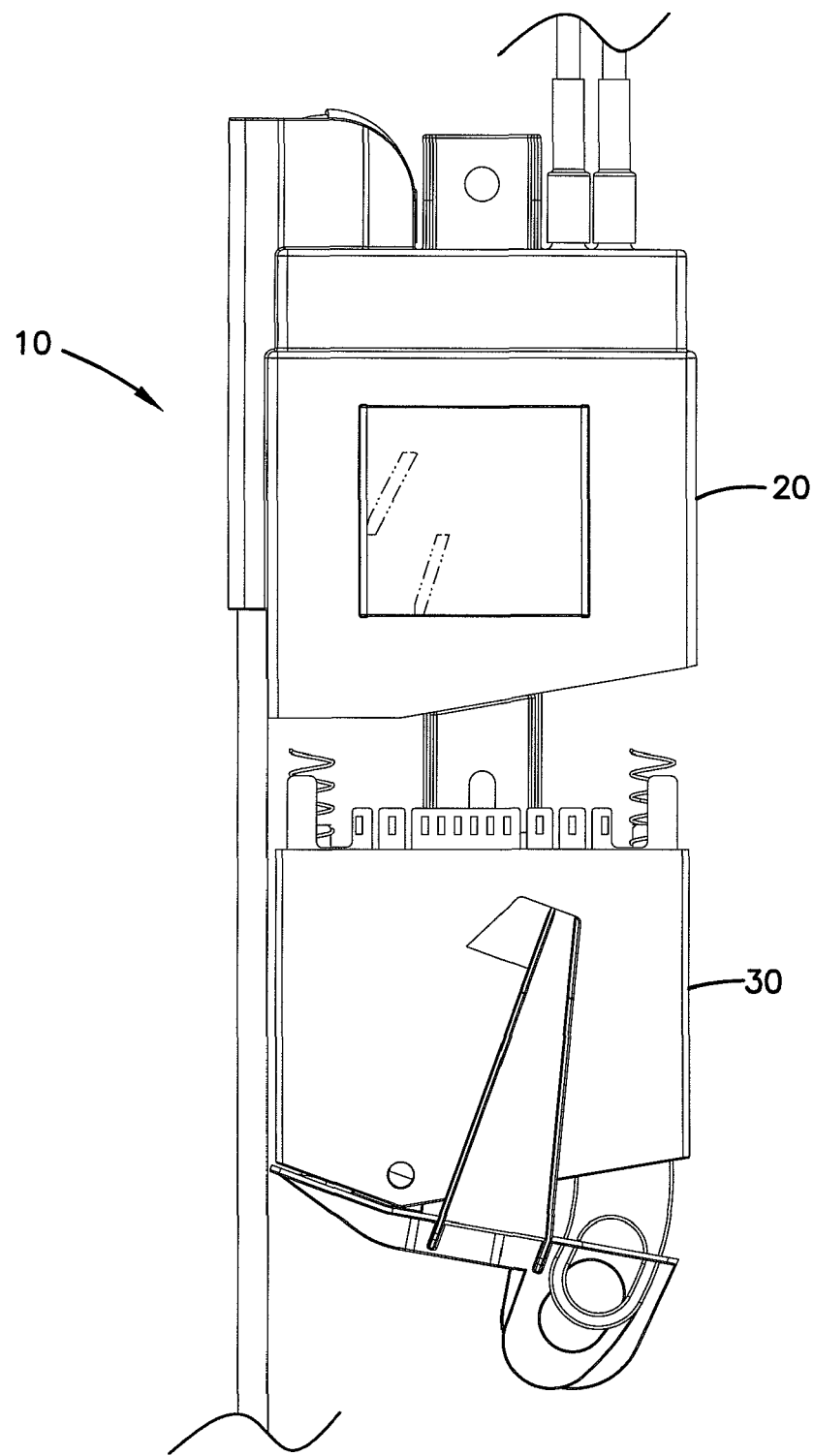

The latch 40 is operated by accessing slot 84 and tab 82 to allow a standard hook stick to operate the latch by an operator located at ground level when housing 10 is located above ground. The hook stick is allowed to access slot 84 through slot 72 on inner housing 30. The hook stick may only be inserted from one side of tab 82 and may only move latch 40 a limited amount, and only in order to move inner housing 30 from an engaged or upper latched position (see FIG. 36) to a lower, disengaged and latched position (see FIGS. 37-39). Inner housing 30 may only be completely removed from outer housing 20 by further pulling on tab 82 by hand (see FIGS. 40-42). By completely removing inner housing 30 from outer housing 20, PCB 32 can be replaced or serviced in order to upgrade circuitry or to replace the circuitry in case of failure due to a lightning strike. The latching feature itself is protected from accidental disengagement and limits failure from outside influences by being housed and operated within a protective pocket of the outer housing. Upon the lower housing and latch being pushed upward by a hook stick from the lower position, the latch mechanism provides clearance on the hook stick for the latch to open and reengage in the upper position with a single pushing action.

The upper latch position is where the PCB edge connector is engaged with the PCB, allowing the PCB circuitry to function. In this position, the internal features of the housing are sealed from outside conditions by a foam gasket between the outer and inner housings. When the inner housing is at a lower latched position, the PCB edge connector is not engaged with the PCB, in turn isolating the broadband signal from the power network. A visual indicator can be located on lower surface 90 of inner housing 30, such as with a visible color, such as yellow, which can be seen from the ground.

In a further embodiment, latch 40 and the circuit can be disengaged remotely with the use of a solenoid 100 powered by the PCB circuitry. This could be activated by a wireless connection, for example. The solenoid 100 is housed within inner housing 30 and would act on latch arm 74, causing it to pivot momentarily and disengage the latch while in the upper latch position. Springs 102 placed between the outer and inner housings would cause the inner housing to move to its lower latched position.

With the present design, the cable connections remain undisturbed on outer housing 20, while the connection circuitry on the PCB can be changed, repaired, or updated in inner housing 30.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A broadband over power line housing comprising:
    a first housing unit including:
        a first cable entry for one or more cables connected to a power line;
        a second cable entry for one or more cables connected to a broadband signal source;
        a first connector for connection to the power line and the broadband signal source;
        a mount for mounting the first housing unit to a power pole or power line;
    a second housing unit including circuitry in the interior for coupling the power line to the broadband signal source and including a second connector for connecting to the first connector;
    a latch having three positions wherein:
        a first latched position wherein the first housing unit and the second housing unit are latched together, wherein the first and second connectors are electrically connected;
        a second latched position wherein the first housing unit and the second housing unit are latched together, wherein the first and second connectors are electrically disconnected;
        a third unlatched position wherein the first and second housing units are movable relative to one another, allowing for the first and second housing units to be separated.

2. The housing of claim 1, wherein the latch for operation between the first and second positions can be operated with a hook stick, and wherein the hook stick cannot move the latch to the third unlatched position by cooperating shapes on the latch and at least one of the first and second housing units.

3. The housing of claim 2, wherein the latch includes slots selectively alignable to move the latch between the first and second positions, and a spring to bias the latch to the first and second positions.

4. The housing of claim 2, wherein the first and second housing units include a visual indicator including a distinguishing color visible when the latch is in the second latched position and hidden when the latch is in the third unlatched position.

5. The housing of claim 1, wherein the second housing unit includes a smaller outer perimeter on an open end relative to an inner perimeter on an open end of the first housing unit, wherein the second housing unit is telescopingly received within the first housing unit.

6. The housing of claim 1, wherein the first connector includes a first mating connector, wherein the circuitry includes a second mating connector matable with the first mating connector.

7. The housing of claim 6, wherein the second housing unit defines a pocket for receiving at least a portion of the circuitry, and further comprising a protective hardened material poured into the pocket to surround portions of the circuitry.

8. The housing of claim 1, wherein the first housing unit includes a shroud disposed around the send cable entry.

9. The housing of claim 1, wherein the latch includes a spring biased latch arm pivotally mounted to the second housing unit, wherein the first housing unit includes a plurality of catches selectively engageable with the latch arm in the first and second latched positions, respectively.

10. The housing of claim 9, wherein the plurality of catches are located in a protective pocket on the first housing unit.

11. A broadband over power line housing comprising:
  an upper housing which receives cable connections and includes a circuit connector;
  a lower housing received by the upper housing, the lower housing including an interior for receiving circuitry connectable to the circuit connector;
  a latch having three positions:
    a first position where the upper and lower housings are latched in a first relative position;
    a second position where the upper and lower housings are latched in a second relative position;
    a third position where the upper and lower housings are unlatched in a third relative position;
  wherein the latch includes alignable slots accessible by a hook stick to move the latch between the first and second positions;
  wherein the alignable slots are not moveable by the hook stick to move the latch to the third position.

12. The housing of claim 11, wherein the lower housing is telescopingly received within a lower end of the upper housing.

13. The housing of claim 11, wherein the latch includes a spring biased, pivotally mounted latch arm.

14. A broadband over power line housing comprising:
  an upper housing which receives cable connections and includes a circuit connector;
  a lower housing telescopingly received by the upper housing, the lower housing including an interior for receiving circuitry connectable to the circuit connector;
  a latch which latches the upper and lower housing in a first position wherein the circuit connector would be connected to the circuitry, wherein the latch further latches the upper and lower housings in a second position wherein the circuit connector is displaced relative to the lower housing wherein the circuit connector would be disconnected from the circuitry.

* * * * *